United States Patent
Riley et al.

(10) Patent No.: US 6,515,071 B1
(45) Date of Patent: Feb. 4, 2003

(54) PROCESS FOR THE PREPARATION OF DICYCLOPENTADIENE MODIFIED POLYESTER RESINS

(75) Inventors: Daniel J. Riley, Dublin, OH (US); Roman Loza, Dublin, OH (US)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 10/152,714

(22) Filed: May 22, 2002

(51) Int. Cl.[7] .......................... C08G 63/52; C08L 67/06
(52) U.S. Cl. .................. 525/44; 528/271; 528/298; 528/306; 528/392; 525/445
(58) Field of Search ................. 528/271, 298, 528/306, 392; 525/44, 445

(56) References Cited

U.S. PATENT DOCUMENTS

| | | | | | |
|---|---|---|---|---|---|
| 3,347,806 A | * | 10/1967 | Zimmermann | ............... | 525/17 |
| 4,029,848 A | * | 6/1977 | Nelson | ....................... | 428/430 |
| 4,148,765 A | * | 4/1979 | Nelson | ....................... | 428/430 |
| 4,233,432 A | * | 11/1980 | Curtis, Jr. | .................... | 428/482 |
| 4,360,634 A | * | 11/1982 | Nelson | ....................... | 525/36 |
| 5,777,065 A | * | 7/1998 | Ho | .............................. | 528/271 |
| 6,384,151 B1 | * | 5/2002 | Matsukawa et al. | ........ | 523/527 |

* cited by examiner

*Primary Examiner*—Samuel A. Acquah
(74) *Attorney, Agent, or Firm*—Martin Connaughton

(57) ABSTRACT

A process for the preparation of dicyclopentadiene (DCPD) modified unsaturated polyester resins is described where the polyester resins have reduced levels of gel particles.

18 Claims, No Drawings

PROCESS FOR THE PREPARATION OF DICYCLOPENTADIENE MODIFIED POLYESTER RESINS

CROSS-REFERENCE TO RELATED APPLICATIONS

Not Applicable

STATEMENT REGARDING FEDERALLY FUNDED RESEARCH OR DEVELOPMENT

Not Applicable

BACKGROUND OF THE INVENTION

The present invention relates to a process of preparing polyester resins. More particularly the invention relates to a method of preparing polyester resins using dicyclopentadiene (DCPD) where the resins have reduced levels of gel particles or which are free of gel particles. DCPD is commonly obtained as a complex mixture of various components derived from a cracking operation. The predominant component of the mixture is the dimer of cyclopentadiene (CPD) dicyclopentadiene. Commercially DCPD is available in a number of grades. Present in most grades are adducts of CPD with isoprene referred to as C-10 co-dimers in addition to other co-dimers and low molecular weight materials. The lower purity grades contain various and increasing amounts of C-15 isomers (trimers) of CPD. The trimer component is important because it is believed that the higher the trimer content the greater the amount of gel particles formed during standard resin processes. Lower grade DCPD can have as much as 2% by weight trimer while typical "polyester grade" DCPD has less than 0.1% trimer content. Trimer content is not the sole cause of gel particle formation. On occasions where lower grade DCPD has been diluted with "polyester grade DCPD to contain less than 0.1% by weight trimer, gel particles can still be a problem.

DCPD modified polyester resins are known. See for example U.S. Pat. Nos. 3,347,806, 4,029,848, 4,148,765 and 4,233,432. Typically, resins are prepared using the higher purity or "polyester grade" DCPD. A general method of preparing DCPD modified polyester resins includes the steps of preparing the half ester by reacting a carboxylic acid or anhydride with polyester grade DCPD in the presence of water. The reaction is normally carried out at atmospheric pressure and a temperature high enough to ensure that the DCPD reacts with the acid or anhydride but is not high enough to cause the DCPD to decompose. The reaction is carried out to a predetermined end point for the half ester formation. This point can be conveniently determined by measuring the acid value of the reaction mixture. Once the predetermined end point of the half ester reaction mixture is reached, multivalent alcohols are added and allowed to react to a predetermined end point. This end point can also be determined by monitoring the acid value. Economically it would be desirable to use the less expensive lower grade DCPD, but the use of the lower grade DCPD tends to yield polyester resin that contain gel particles. Gel particles are undesirable in part because they are a contaminant in the resin and tend to plug spraying equipment and filters. In order to remove the gel particles the resin must be filtered. Although resins may be filtered to remove minor amounts of particulates the presence of gel particles causes increased problems due to filter fouling. The gel particles also represent a reduction in the percent yield of resin in a batch. So while it would be desirable to use low grade DCPD in polyester production the costs associated with dealing with gel particle formation offsets the lower material cost. Efforts have been made to prepare gel particle free polyester resins using low grade DCPD. U.S. Pat. No 4,360,634 discloses polyester resins made using diene oligomers. According to the patent the product can be prepared using standard methods of preparation for DCPD modified polyester resins. The stated advantage of the invention is the use of oligomers of crude DCPD prepared by heating the crude diene under a pressure of from 100 to 200 psig at a temperature of from 150° C. to 200° C. for a period of from 30 minutes to 4 hours prior to adding to the ester reaction. Korean Patent No. 98-026116 discloses a method of preparing DCPD modified polyester resins using low purity DCPD where the formation of gel particles is reduced. The method discloses the reaction of 70% to 80% pure DCPD with multivalent unsaturated acids in the presence of an oxidation preventing reagent and/or a polymerization preventing agent. It is stated that although the half ester method can be used the invention is not limited to any one method. U.S. Pat. No. 5,777,065 discloses a method of making polyester alkyd resins having reduced gel particle content where prior to adding a low purity DCPD, from 10 to 300 ppm of an aromatic inhibitor is added to reaction mixture.

BRIEF SUMMARY OF THE INVENTION

The present invention relates to a process for preparing polyester resins free of or substantially free of gel particles even when low purity DCPD is used. The process comprises forming the half ester and then raising the temperature of the half ester reaction mixture to from 165° C. to 220° C. and holding the reaction mixture at the desired temperature for up to 120 minutes while optionally removing volatiles.

The formation of the half ester can be carried out using process parameters typically used in the preparation of DCPD modified esters. In practice it is preferable to perform the half ester reaction step at atmospheric pressure and a maximum temperature of 150° C. After the half ester step is complete but before addition of the multivalent alcohol the half ester reaction mixture is heated to a temperature of 165° C. to 220° C. for up to 120 minutes while optionally removing volatiles. Subsequent to the heating step a multivalent alcohol is added to the reaction mixture. The multivalent alcohol can be added in a single addition step or over time. Preferably the alcohol is added at a rate such that the temperature of the reaction mixture is maintained in the 165° C. to 220° C. range. Most preferably the alcohol is pumped into the reaction mixture at a rate so that the temperature of the reaction mixture is maintained in the desired range. The condensation reaction of the alcohol and half ester is carried out with removal of volatiles. The condensation reaction is carried out to a predetermined acid value generally between 5 and 45. When prepared according to the invention the formation of gel particles is reduced or the gel particles are completely eliminated. No prereaction of the DCPD is needed. No additional oxidation or polymerization preventing agents or inhibitors other than those present in the commercially available raw materials need be added during the preparation of the half ester.

BRIEF DESCRIPTION OF THE SEVERAL VIEWS OF THE DRAWING

Not Applicable

DETAILED DESCRIPTION OF THE INVENTION

The present invention relates to a process of preparing polyester resins preferably using low grade DCPD. The resins prepared according to the process of the invention have reduced levels of gel particles. In a process of the invention where the reactor is sealed during heating prior to addition of the glycols the resin product contains about 10% by weight or less of the amount of gel particles based on the total weight of the undiluted resin, typically produced in resins prepared using low grade DCPD by known methods of preparation. In a preferred version of the process where volatiles are removed during the heating step that is performed after the half ester reaction step and prior to addition of glycols gel particle content is reduced to less than 0.01% by weight in filtration residue based on the total weight of the undiluted resin. In many instances gel particles are not detectable in the filter residue.

In the first step of the process DCPD preferably low grade DCPD and a carboxylic acid having at least two carboxy functional groups or the corresponding anhydride are reacted in the presence of water. From 1% to 100% by weight of the carboxylic acid or corresponding anhydride contain ethylenic unsaturation. The reaction can be carried out at any temperature at which the formation of the half ester proceeds. Generally a temperature between 50° C. and 150° C. is used. A preferred temperature range is from 70° C. to 140° C. In a more preferred embodiment the temperature of the half ester reaction mixture is carried out at a maximum temperature of 132° C. The reaction to form the half ester is continued until a majority of the DCPD is reacted. Acid value is a convenient method of monitoring the reaction. The predetermined acid value signifying the point at which a majority of the DCPD has reacted will depend on the composition of the specific reaction mixture. For example, if 1 mole of DCPD is reacted with one mole of maleic anhydride in the presence of 1.1 moles of water the acid value target (using ASTM test method D 1639-90) would be 210 to 240. A preferred acid value range for the present process is from 210 to 260. When the predetermined acid value range has been reached for the half ester reaction mixture the mixture is heated to a temperature of from 165° C. to 220° C., preferably from 180° C. to 205° C., most preferably 195° C. Typically the reaction mixture is heated to temperature at a rate of 0.1 to 4.0° C. per second. After heating to the desired temperature the reaction mixture is held at temperature for up to 120 minutes. Preferably the mixture is held at temperature for up to 90 minutes. And most preferably the reaction mixture is held at temperature for up to 45 minutes. It was determined that a hold time is not needed at temperatures of 195° C. and above. However, the half ester reaction mixture is generally held at the desired temperature for 15 minutes to ensure that gel particles are not formed. Both the half ester formation step and heating step are carried out at atmospheric pressure without removal of volatiles. However either or both steps can be carried out at sub- or super atmospheric pressure with the optional removal of volatiles and under an inert atmosphere. Examples of which include simple distillation, distillation with nitrogen sparge or vacuum stripping.

On completion of the heating step a multivalent alcohol is added to the half ester reaction mixture. The alcohol can be added in a single addition or incrementally. Although the reaction mixture can be allowed to cool, it is preferred to add the alcohol incrementally so as to maintain the 165° C. to 220° C. temperature of the reaction mixture. After completion of the addition of the alcohol the reaction mixture is allowed to react at temperature with removal of volatiles until a predetermined acid value is obtained for the resin mixture. Volatiles can be removed by any convenient means. The predetermined acid value of the alcohol reaction mixture will depend on the desired handling characteristics of the resin. Typical ranges for acid values can be between 5 and 45, preferably between 10 and 40, most preferably between 10 and 35.

On completion of the reaction to form the DCPD modified polyester resin the resin is cooled and diluted with a soluble monomer such as styrene. Commonly used additives such as polymerization inhibitors and the like can be added at this point. If filtration to remove gel particles is necessary it is usually performed prior to pumping the diluted resin to storage. Filtration in commercial operations is usually done by pumping the diluted resin through a 100 to 200 micron bag filter.

The object of the invention is to provide a process to prepare DCPD modified unsaturated polyester resins with little or no gel particle content preferably from the more economical low grade DCPD. Low grade DCPD has greater than 0.1% by weight C-5 trimer. A typical range of trimer content for low grade DCPD is from greater than 0.1% by weight to 2.0% by weight. Examples of low grade DCPD includes those available from Equistar designated as DCPD 100 and 101.

Examples of ethylenically unsaturated carboxylic acids containing at least two carboxy functional groups or their corresponding anhydrides include maleic acid, fumaric acid, itaconic acid, maleic anhydride and mixtures thereof. In addition other acids, anhydrides or esters of the acids can be used in the process. Examples of such acids include phthalic acid, isophthalic acid, terephthalic acid, tetrahydrophthalic anhydride, phthalic anhydride and the like. Maleic acid or maleic anhydride are preferred. Water is present in order to ensure that any anhydride present is hydrolyzed to the corresponding acid.

A wide variety of multivalent alcohols can be used in the process of the invention. Examples would include common diols such as ethylene glycol, diethylene glycol, propylene glycol, dipropylene glycol, neopentyl glycol, 1,3-propanediol, 1,4-propanediol, 1,4-butanediol, and polyoxyalkylene alkylene glycols. Triols and higher functional polyols such as glycerol, trimethylol propane and oxyalkylated adducts thereof can also be used.

Other components used with the resins are those known in the art and include soluble monomers, catalysts and inhibitors. The monomers include but are not limited to (meth) acrylate esters such as methylmethacrylate and substituted styrenes such as vinyl toluene and styrene. Styrene is a preferred monomer. Catalysts for esterification and to aid in the maleate to fumarate isomerization can be added. Examples of isomerization catalysts include morpholine, piperidine, and the like. Examples of esterification catalysts include mineral acids, methanesulfonic acid, toluenesulfonic acid as well as Lewis acids and zinc acetate. Commonly used inhibitors include hydroquinone, p-benzoquinone, di-t-butylhydroquinone, t-butylcatechol, phenothiazine, and the like.

The DCPD modified unsaturated polyester resins prepared according to the process of the present invention can be used in any applications in which DCPD modified unsaturated polyester resins are normally used. Examples of such uses include SMC, RTM, preparation of fiberglass reinforced boats, whirlpool baths, etc.

Having thus described the invention the following examples are provided as illustrations of the invention and should not be construed as limiting in nature.

ASTM D1639-90 was used to determine acid values. ASTM 1545-89 was used to determine the viscosity of the styrene diluted resin unless specifically noted otherwise
Following are examples of a generic standard procedures
and embodiments of the process of the invention.

Procedure I (Standard Procedure)

71.9 g of water and 506.85 g DCPD 101 having greater than 0.1%by weight trimer is charged to a reactor with stirring and heated to 65° C. After heating 202.3 g of maleic anhydride is added to the reaction vessel. The reaction is exothermic. The temperature is not allowed to exceed 132° C. After the exotherm is complete and the temperature is below 100° C. an additional 165.5 g of maleic anhydride is added to the reaction vessel. A temperature of 125° C. is maintained for 30 minutes. When an acid value of 230 to 260 is obtained for the half ester reaction mixture glycol and 50 ppm hydroquinone are added to the reaction mixture and the contents of the vessel are heated to 195° C. with removal of volatiles. The reaction is allowed to run until the resin has an acid value of between 18 and 35 and a stokes viscosity of 11 to 14 (75/25, resin/styrene w/w). The resin is allowed to cool to 100° C. and 333.5 g of styrene containing 0.09 g of toluhydroquinone (THQ), and 0.05 g of butylated hydroxy toluene (BHT) dissolved in glycol ether are added.

Procedure II 71.9 g of water and 506.85 g DCPD having greater than 0.1% by weight trimer is charged to a reactor with stirring and heated to 65° C. After heating, 202.3 g of maleic anhydride is added to the reaction vessel. The reaction is exothermic. The temperature is not allowed to exceed 132° C. After the exotherm is complete and the temperature is below 100° C. an additional 165.5 g of maleic anhydride is added to the reaction vessel. A temperature of 125° C. is maintained for 30 minutes. When an acid value of 230 to 260 is reached the reactor is sealed and heated to a temperature of from 165° C. to 220° C. and held at temperature for up to 90 minutes. After heating and holding at temperature glycol(s) and 50 ppm hydroquinone are added to the reaction vessel at a temperature of between 180° C. to 220° C. with removal of volatiles. The reaction is allowed to continue until the resin has an acid value of from 18 to 35 and a stokes viscosity of from 11 to 14 (75/25 resin/styrene). The resin is allowed to cool to 100° C. and 333.5 g of styrene, containing 0.09 g of toluhydroquinone (THQ), and 0.05 g of butylated hydroxy toluene (BHT) dissolved in glycol ether are added.

Procedure III 71.9 g of water and 506.85 g DCPD having greater than 0.1% by weight trimer is charged to a reactor with stirring and heated to 65° C. After heating, 202.3 g of maleic anhydride is added to the reaction vessel. The reaction is exothermic. The temperature is not allowed to exceed 132° C. After the exotherm is complete and the temperature is below 100° C. an additional 165.5 g of maleic anhydride is added to the reaction vessel. A temperature of 125° C. is maintained for 30 minutes. When an acid value of 230 to 260 is reached the reaction mixture is heated to a temperature of from 165° C. to 220° C. with removal of volatiles and held at temperature for up to 120 minutes. After heating and holding at temperature glycol(s) and 50 ppm hydroquinone are added to the reaction vessel at a temperature of between 165° C. to 220° C. with removal of volatiles. The reaction is allowed to continue until the resin has an acid value of from 18 to 35 and a stokes viscosity of from 11 to 14 (75/25 resin/styrene). The resin is allowed to cool to 100° C. and 333.5 g of styrene, containing 0.09 g of toluhydroquinone (THQ), and 0.05 g of butylated hydroxy toluene (BHT) dissolved in glycol ether are added.

Procedure IV 71.9 g of water and 506.85 g DCPD having greater than 0.1% by weight trimer is charged to a reactor with stirring and heated to 65° C. After heating, 202.3 g of maleic anhydride is added to the reaction vessel. The reaction is exothermic. The temperature is not allowed to exceed 132° C. After the exotherm is complete and the temperature is below 100° C. an additional 165.5 g of maleic anhydride is added to the reaction vessel. A temperature of 125° C. is maintained for 30 minutes. When an acid value of 230 to 260 is reached the reaction mixture is heated to a temperature of from 165° C. to 220° C. with removal of volatiles and held at temperature for up to 120 minutes. After heating and holding at temperature 50 ppm hydroquinone is added and glycol(s) are pumped into the reaction vessel over a period of time ranging from 30 minutes to 3 hours at a temperature of between 180° C. to 220° C. with removal of volatiles. The reaction is allowed to continue until the resin has an acid value of from 18 to 35 and a stokes viscosity of from 11 to 14 (75/25 resin/styrene). The resin is allowed to cool to 100° C. and 333.5 g of styrene, containing 0.09 g of toluhydroquinone (THQ), and 0.05 g of butylated hydroxy toluene (BHT) dissolved in glycol ether are added.

Procedures II–IV, procedures according to the invention yield resins with reduced levels of gel particles when compared to the resin prepared by the standard process of Procedure I.

EXAMPLE 1

(Comparative)

A resin was prepared according to Procedure I.

401 g of DCPD 101 having a trimer content of 0.94% by weight and 57 g of deionized water were charged with stirring to a reaction vessel and heated to 65° C. Heat to 127° C. and charged 160 g maleic anhydride. The reaction vessel was purged 5 times with nitrogen to 45 psig. The reaction mixture was allowed to heat to 130° C., held at temperature for 30 minutes and cooled to 87° C. A second charge of 131 g of maleic anhydride was added after hearing to 127° C. The vessel was resealed and purged 5 times with nitrogen to 45 psig. The temperature was allowed to return to 130° C. and held for 30 minutes. After 30 minutes an acid value of 222 was obtained. The reaction vessel was padded with nitrogen cooled and shut down over night. The next day the reaction mixture was heated to 135° C. and 57 g of diethylene glycol, 64 g of ethylene glycol and 0.04 g of hydroquinone were charged to the reactor. The mixture was heated to 210° C. with removal of volatiles. A nitrogen sparge was begun when the temperature reached 180° C. After holding at 210° C. for 60 minutes the reaction was sampled once an hour to determine the acid value. The reaction was carried out until an acid value of 36.7 was obtained. The reaction vessel was opened to the atmosphere and the resin mixture cooled to 90° C. The resin was then diluted with 217 g of styrene containing 0.01 g p-benzoquinone, 0.06 hydroquinone, 0.01 g 8% copper naphthanate, 0.23 g of glycol ether and 0.03 g butylated hydroxytoluene. A sample of the diluted resin was filtered through a GARDCO extra fine paint filter commercially available through the Paul N Gardener Company, Inc. The residue was washed twice with acetone and dried under vacuum. The resin contained 0.32% by weight gel particles based on the weight of the undiluted resin.

EXAMPLE 2

A resin was prepared according to Procedure II of the invention.

The materials used were the same as those used in Example 1. The DCPD had a dimer content of 0.94% by weight. After obtaining an acid value of 240 for the half ester reaction mixture the reaction vessel was sealed and the mixture was heated to 195° C. and held at that temperature for 45 minutes before adding the glycols and hydroquinone. The resin mixture had a final acid value of 33.7 and 0.03% by weight gel particles based on the weight of the undiluted resin.

EXAMPLE 3

A resin was prepared according to Procedure III.

The materials were the same as those used in Example 1. After obtaining an acid value of 234 for the half ester reaction mixture the mixture was heated to 195° C. and held at temperature for 45 minutes with removal of volatiles prior to adding the glycols and hydroquinone. The resin mixture had a final acid value of 28.0 and there were no gel particles detectible in the filter residue.

Examples 4 and 5 were prepared using a DCPD mixture. The first component of the mixture was DCPD 101 which had a trimer content of 0.99% by weight. The other component of the mixture was a polyester grade DCPD from Philips which had a trimer content of 0.02% by weight. The DCPD mixture had an average trimer content of about 0.08% by weight.

EXAMPLE 4
(Comparative)

Example 4 was prepared according to Procedure I. The components and amounts used are as follows.

| Components | Amounts |
| --- | --- |
| Water | 51.0 |
| DCPD 101 | 27.3 |
| DCPD (polyester grade) | 363.1 |
| Maleic anhydride (1st) | 141.7 |
| Maleic anhydride (2nd) | 115.8 |
| Diethylene glycol | 50.1 |
| Ethylene glycol | 56.9 |
| Hydroquinone | 0.09 |

The resin was reacted to final acid value of 24. It was diluted with styrene. The diluted resin was filtered, the solids washed with acetone and dried under vacuum. The resin contained 0.03% by weight gels based on the weight of the undiluted resin.

EXAMPLE 5

Example 5 was prepared according to Procedure III. The components and amounts used are as follows.

| Component | Amount (g) |
| --- | --- |
| Water | 50.3 |
| DCPD 101 | 27.3 |
| DCPD (polyester grade) | 363.0 |
| Maleic anhydride (1st) | 141.6 |
| Maleic anhydride (2nd) | 116.0 |
| Diethylene glycol | 50.2 |
| Ethylene glycol | 57.0 |
| Hydroquinone (20%) | 0.18 |

The resin was reacted to a final acid value of 25. It was diluted with styrene. The diluted resin was filtered, the solids washed with acetone and dried under vacuum. No gel particles were detected.

Having described the invention,

We claim:

1. A process for preparing polyester resins, comprising;
   A. forming a half ester by reacting a mixture of DCPD, water and a carboxylic acid having at least two carboxy functional groups or the corresponding anhydride to form the half ester where from 1 to 100% of the total acid or anhydride charge is an ethylenically unsaturated carboxylic acid or corresponding anhydride,
   B. after forming the half ester heating the half ester reaction mixture to a temperature of from 165° C. to 220° C., holding the mixture at the temperature for up to 120 minutes, and
   C. adding a multivalent alcohol to the reaction mixture and reacting with removal of volatiles to a predetermined acid value.

2. The process as claimed in claim 1, wherein the reaction to form the half ester is carried out at a temperature of from 50° C. to 150° C.

3. The process as claimed in claim 1, wherein the reaction to form the half ester is carried out at a temperature of from 70° C. to 140° C.

4. The process as claimed in claim 1, wherein the reaction to form the half ester is carried out at a maximum temperature of 132° C.

5. The process as claimed in claim 1, wherein the reaction to form the half ester is carried out to a point where the reaction mixture has an acid value of from 210 to 260.

6. The process as claimed in claim 1, wherein the reaction to form the half ester is carried out under an inert atmosphere with removal of volatiles.

7. The process as claimed in claim 5, wherein after an acid value of from 210 to 260 for the half ester reaction mixture is obtained the temperature of the mixture is raised to from 180° C. to 205° C. and held at temperature for up to 120 minutes.

8. The process as claimed in claim 5, wherein after an acid value of from 210 to 260 forth half ester reaction mixture is obtained the temperature is raised to 195° C. and held at temperature for up to 120 minutes.

9. The process as claimed in claim 1, wherein the heating of the half ester reaction mixture to 165° C. to 220° C. is carried out under inert atmosphere with removal of volatiles.

10. The process as claimed in claim 1, wherein the predetermined acid value of the multivalent alcohol reaction mixture is from 5 to 45.

11. The process as claimed in claim 1, wherein the predetermined acid value of the multivalent alcohol reaction mixture is from 10 to 35.

12. The process as claimed in claim 1, wherein the DCPD has a trimer content of greater than 0.1 wt % based on the total weight of the DCPD.

13. The process as claimed in claim 1, wherein the ethylenically unsaturated carboxylic acid or corresponding anhydride is maleic acid, fumaric acid, itaconic acid, maleic anhydride, or mixtures thereof.

14. The process as claimed in claim 1, wherein the multivalent alcohol is ethylene glycol, diethylene glycol, propylene glycol, dipropylene glycol, neopentylglycol or mixtures thereof.

15. The process as claimed in claim 1 wherein the multivalent alcohol is added to the half ester reaction mixture over a period of time from 30 minutes to 3 hours.

16. The process as claimed in claim 1, wherein the formation of the half ester is carried out without removal of volatiles.

17. The process as claimed in claim 1, wherein the heating of the half ester reaction mixture is carried out without removal of volatiles.

18. A process for preparing polyester resin, comprising;
A. forming a half ester by reacting a mixture of DCPD, water and carboxylic acid having at least two carboxy funtional groups or the corresponding anhydride where from 1 to 100% of the total acid or anhydride charge is an ethylenically unsaturated carboxylic acid or corresponding anhydride at a temperature of from 50° C. to 140° C. under an inert atmosphere with removal of volatiles,
B. after forming the half ester heating the reaction mixture to a temperature of from 165° C. to 220° C., holding the reaction mixture at temperature for up to 120 minutes under an inert atmosphere with removal of volatiles, and
C. adding a multivalent alcohol overtime to the half ester and reacting with removal of volatiles to a predetermined acid value.

* * * * *